(12) United States Patent
Fukao et al.

(10) Patent No.: US 10,137,899 B2
(45) Date of Patent: Nov. 27, 2018

(54) VEHICLE DRIVING SYSTEM, CONTROL APPARATUS FOR VEHICLE DRIVING SYSTEM, AND CONTROL METHOD FOR VEHICLE DRIVING SYSTEM

(71) Applicant: TOYOTA JIDOSHA KABUSHIKI KAISHA, Toyota-shi, Aichi-ken (JP)

(72) Inventors: Mitsuhiro Fukao, Toyota (JP); Hiroki Kondo, Miyoshi (JP); Akira Hino, Toyota (JP); Daisuke Inoue, Toyota (JP); Akihide Ito, Nagoya (JP); Atsushi Ayabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 180 days.

(21) Appl. No.: 15/114,963

(22) PCT Filed: Sep. 10, 2014

(86) PCT No.: PCT/IB2014/002014
§ 371 (c)(1),
(2) Date: Jul. 28, 2016

(87) PCT Pub. No.: WO2015/118371
PCT Pub. Date: Aug. 13, 2015

(65) Prior Publication Data
US 2016/0347317 A1 Dec. 1, 2016

(30) Foreign Application Priority Data

Feb. 6, 2014 (JP) ................................. 2014-021425

(51) Int. Cl.
*B60W 10/06* (2006.01)
*B60W 30/188* (2012.01)
(Continued)

(52) U.S. Cl.
CPC .......... *B60W 30/188* (2013.01); *B60W 10/02* (2013.01); *B60W 10/06* (2013.01);
(Continued)

(58) Field of Classification Search
CPC .... B60W 10/02; B60W 10/107; B60W 10/06; B60W 2710/02; B60W 2710/0644;
(Continued)

(56) References Cited

U.S. PATENT DOCUMENTS

| 4,564,906 A | 1/1986 | Stephan et al. |
| 5,662,547 A * | 9/1997 | Moroto ............... F16H 37/0846 |
| | | 477/48 |

(Continued)

FOREIGN PATENT DOCUMENTS

| JP | 2007-278475 A | 10/2007 |
| JP | 2010-138961 A | 6/2010 |

(Continued)

*Primary Examiner* — Roger L Pang
(74) *Attorney, Agent, or Firm* — Oliff PLC (57) ABSTRACT

A clutch mechanism is configured to selectively change between a first power transmission path and a second power transmission path. The first power transmission path is configured to transmit torque to an output shaft via a transmission mechanism. The second power transmission path is configured to transmit the torque to the output shaft via a continuously variable transmission mechanism. An electronic control unit is configured to: (a) selectively change a power transmission path during traveling to one of the first power transmission path and the second power transmission path by controlling the clutch mechanism; and (b) in changing the power transmission path by controlling the clutch mechanism, control an operating point of the internal combustion engine during a change of the power (Continued)

transmission path so that the operating point crosses over an optimum fuel, consumption line of the internal combustion engine.

14 Claims, 5 Drawing Sheets

(51) Int. Cl.
| | |
|---|---|
| *F16H 61/02* | (2006.01) |
| *F16H 37/02* | (2006.01) |
| *F16H 61/662* | (2006.01) |
| *B60W 10/02* | (2006.01) |
| *B60W 10/107* | (2012.01) |
| *F16H 61/00* | (2006.01) |

(52) U.S. Cl.
CPC ......... *B60W 10/107* (2013.01); *F16H 37/022* (2013.01); *F16H 61/0213* (2013.01); *F16H 61/66259* (2013.01); *B60W 2510/0208* (2013.01); *B60W 2510/1005* (2013.01); *B60W 2710/02* (2013.01); *B60W 2710/0644* (2013.01); *B60W 2710/1094* (2013.01); *B60W 2900/00* (2013.01); *B60Y 2300/52* (2013.01); *F16H 2037/023* (2013.01); *F16H 2037/026* (2013.01); *F16H 2061/0015* (2013.01); *Y10T 477/623* (2015.01); *Y10T 477/6203* (2015.01); *Y10T 477/693* (2015.01); *Y10T 477/6933* (2015.01)

(58) Field of Classification Search
CPC ... B60W 2710/1094; B60W 2510/0208; F16H 61/6259; F16H 37/022; F16H 61/0213; F16H 2037/023; F16H 2061/015; F16H 61/66259; F16H 2061/0015; Y10T 477/6933; Y10T 477/623; Y10T 477/693; Y10T 477/6203; F60Y 2300/52; B60Y 2300/52

See application file for complete search history.

(56) References Cited

U.S. PATENT DOCUMENTS

| | | | | |
|---|---|---|---|---|
| 9,829,102 | B2* | 11/2017 | Fukao | ............... F16H 61/66259 |
| 10,012,297 | B2* | 7/2018 | Fukao | ................... B60K 17/00 |
| 2007/0238569 | A1 | 10/2007 | Sato | |
| 2015/0087463 | A1 | 3/2015 | Nakagawa et al. | |

FOREIGN PATENT DOCUMENTS

| | | |
|---|---|---|
| JP | 2012-163128 A | 8/2012 |
| WO | 2013/176208 A1 | 11/2013 |

\* cited by examiner

VEHICLE DRIVING SYSTEM, CONTROL APPARATUS FOR VEHICLE DRIVING SYSTEM, AND CONTROL METHOD FOR VEHICLE DRIVING SYSTEM

BACKGROUND OF THE INVENTION

1. Field of the Invention

The invention relates to a vehicle driving system, a control apparatus for a vehicle driving system, and a control method for a vehicle driving system and, more particularly, to changing a power transmission path of a vehicle driving system including a continuously variable transmission mechanism and a mechanical transmission mechanism in parallel with each other, the mechanical transmission mechanism having at least one gear ratio.

2. Description of Related Art

There has been suggested a vehicle driving system including a continuously variable transmission mechanism and a transmission mechanism in parallel with each other in a power transmission path between an internal combustion engine and drive wheels. The continuously variable transmission mechanism is able to continuously change a speed ratio. The transmission mechanism has at least one gear ratio. For example, a vehicle driving system described in Japanese Patent Application Publication No. 2007-278475 (JP 2007-278475 A) is one of such vehicle driving systems. In the vehicle driving system described in JP 2007-278475 A, a continuously variable transmission mechanism and a stepped transmission mechanism are provided in parallel with each other in a power transmission path between an internal combustion engine and drive wheels. When the vehicle starts moving, driving force is transmitted in a state where the stepped transmission mechanism is set to a low fixed speed step. When the vehicle speed has increased, power is transmitted by changing into the continuously variable transmission mechanism. When the vehicle speed has increased and enters a high vehicle speed region, the stepped transmission mechanism is changed into an overdrive fixed speed step, and then power is transmitted.

SUMMARY OF THE INVENTION

In the thus configured vehicle driving system, when the vehicle travels by using the continuously variable transmission mechanism, it is possible to set a target rotation speed of the internal combustion engine on the basis of the intersection of an equal power line with an optimum fuel consumption line at each throttle opening degree. On the other hand, in the case of the stepped transmission mechanism (transmission mechanism), because the gear ratio is constant, power deviates from an optimum fuel consumption line at each gear step except just one point. In the configuration including the continuously variable transmission mechanism and the stepped transmission mechanism in parallel with each other, in changing between these power transmission paths, a step shift is carried out by changing the engaged/released states of a clutch mechanism that selectively changes between the power transmission paths.

An example of a step shift for changing from the power transmission path including the stepped transmission mechanism to the power transmission path including the continuously variable transmission mechanism, for example, with an increase in vehicle speed will be described. As one method for a step shift, it is conceivable to employ a method of causing a shift characteristic to trace the optimum fuel consumption line as in the case of a continuously variable shift. In this case, it is required to extend a shift time of a step shift, and there is a possibility that the durability of friction materials of the clutch mechanism that changes the engaged/released states in carrying out a step shift decreases.

The invention provides a vehicle driving system that includes a continuously variable transmission mechanism and a transmission mechanism in parallel with each other and that suppresses a decrease in the durability of a clutch mechanism in changing a power transmission path between a power transmission path including the continuously variable transmission mechanism and a power transmission path including the transmission mechanism, a control apparatus for the vehicle driving system, and a control method for the vehicle driving system.

A first aspect of the invention provides a control apparatus for a vehicle driving system. The vehicle driving system includes a continuously variable transmission mechanism, a transmission mechanism and a clutch mechanism. The continuously variable transmission mechanism and the transmission mechanism are provided in parallel with each other in a power transmission path between an input shaft and an output shaft. Torque output from an internal combustion engine is transmitted to the input shaft. The output shaft is coupled to a drive wheel so as to transmit power. The transmission mechanism has at least one gear ratio. The clutch mechanism is configured to selectively change between a first power transmission path and a second power transmission path. The first power transmission path is configured to transmit the torque to the output shaft via the transmission mechanism. The second power transmission path is configured to transmit the torque to the output shaft via the continuously variable transmission mechanism. The control apparatus includes an electronic control unit configured to: (a) selectively change a power transmission path during traveling to one of the first power transmission path and the second power transmission path by controlling the clutch mechanism; and (b) in changing the power transmission path by controlling the clutch mechanism, control an operating point of the internal combustion engine during a change of the power transmission path so that the operating point crosses over an optimum fuel consumption line of the internal combustion engine.

Generally, a fuel consumption amount increases as the operating point of the internal combustion engine distances from the optimum fuel consumption line of the internal combustion engine in an equal power line. Thus, during a change of the power transmission path, it is desirable to cause the operating point of the internal combustion engine to trace the optimum fuel consumption line; however, there is a possibility that a time that is required for the change extends and the durability of friction materials that constitute the clutch mechanism decreases. Therefore, by setting the operating point of the internal combustion engine so that the operating point crosses over the optimum fuel consumption line of the internal combustion engine during the change of the power transmission path, it is possible to use a region close to the optimum fuel consumption line in a change transitional period, so extension of a time that is required for the change is suppressed, with the result that a decrease in the durability of the clutch mechanism is also suppressed. For example, when the changed operating point of the internal combustion engine is caused to coincide with the optimum fuel consumption line at the end of change of the power transmission path without crossing over the optimum fuel consumption line, the fuel consumption amount increases because a deviation from the optimum fuel consumption line at the start of change is large; however, the fuel consumption amount is reduced when the operating point crosses over the optimum fuel consumption line.

In the control apparatus according to the above aspect, the electronic control unit may be configured to set an operating point of the internal combustion engine for determining a start of change of the power transmission path and a rate of change in a rotation speed of the internal combustion engine during the change so that a median value between rotation speeds of the internal combustion engine before and after the change of the power transmission path during the change passes through one of the optimum fuel consumption line and near the optimum fuel consumption line. By setting in this way, the fuel consumption amount during the change is minimized on the assumption that the fuel economy deteriorates as the operating point of the internal combustion engine deviates from the optimum fuel consumption line.

In the control apparatus according to the above aspect, the electronic control unit may be configured to set an operating point of the internal combustion engine for determining a start of change of the power transmission path and a rate of change in a rotation speed of the internal combustion engine during the change so that a fuel consumption amount of the internal combustion engine is minimized in a range in which the operating point of the internal combustion engine crosses over the optimum fuel consumption line during the change. The fuel consumption amount may be consumed during the change. By setting in this way, the fuel consumption amount during the change is minimized in the range in which the operating point crosses over the optimum fuel consumption line during the change.

In the control apparatus according to the above aspect, the electronic control unit may be configured to set the operating point of the internal combustion engine for determining the start of change of the power transmission path and the rate of change in the rotation speed of the internal combustion engine during the change so that a difference between a fuel consumption during the change and a reference fuel consumption is minimized. The reference fuel consumption may be set when the operating point of the internal combustion engine during the change is kept in the optimum fuel consumption line. In this way, by setting the change start determination operating point of the internal combustion engine and the rate of change in the rotation speed of the internal combustion engine during the change of the power transmission path so that the difference between the fuel consumption during the change and the reference fuel consumption is minimized, the fuel consumption amount during the change is minimized in the range in which the operating point crosses over the optimum fuel consumption line during the change.

In the control apparatus according to the above aspect, the transmission mechanism may have at least one of a gear ratio larger than a maximum speed ratio of the continuously variable transmission mechanism or a gear ratio smaller than a minimum speed ratio of the continuously variable transmission mechanism. Thus, when the transmission mechanism has a gear ratio larger than the maximum speed ratio of the continuously variable transmission mechanism, an upshift is carried out in the case of changing from the first power transmission path to the second power transmission path, and a downshift is carried out in the case of changing from the second power transmission path to the first power transmission path. When the transmission mechanism has a gear ratio smaller than the minimum speed ratio of the continuously variable transmission mechanism, a downshift is carried out in the case of changing from the first power transmission path to the second power transmission path, and an upshift is carried out in the case of changing from the second power transmission path to the first power transmission path. By controlling the operating point of the internal combustion engine so that the operating point crosses over the optimum fuel consumption line during these changes of the power transmission path, a decrease in the durability of the clutch mechanism is suppressed. The fuel consumption amount is also reduced.

A second aspect of the invention provides a control method for a vehicle driving system. The vehicle driving system includes a continuously variable transmission mechanism, a transmission mechanism, a clutch mechanism, and an electronic control unit. The continuously variable transmission mechanism and the transmission mechanism are provided in parallel with each other in a power transmission path between an input shaft and an output shaft. Torque output from an internal combustion engine is transmitted to the input shaft. The output shaft is coupled to a drive wheel so as to transmit power. The transmission mechanism has at least one gear ratio. The clutch mechanism is configured to selectively change between a first power transmission path and a second power transmission path. The first power transmission path is configured to transmit the torque to the output shaft via the transmission mechanism. The second power transmission path is configured to transmit the torque to the output shaft via the continuously variable transmission mechanism. The control method includes: (a) selectively changing, by the electronic control unit, the power transmission path during traveling to one of the first power transmission path and the second power transmission path by controlling the clutch mechanism; and (b) in changing the power transmission path by controlling the clutch mechanism, controlling, by the electronic control unit, an operating point of the internal combustion engine during a change of the power transmission path so that the operating point crosses over an optimum fuel consumption line of the internal combustion engine.

A third aspect of the invention provides a vehicle driving system. The vehicle driving system includes an input shaft, an output shaft, a continuously variable transmission mechanism, a transmission mechanism, a clutch mechanism, and an electronic control unit. Torque output from an internal combustion engine is transmitted to the input shaft. The output shaft is coupled to a drive wheel so as to transmit power. The continuously variable transmission mechanism and the transmission mechanism are provided in parallel with each other in a power transmission path between the input shaft and the output shaft. The transmission mechanism has at least one gear ratio. The clutch mechanism is configured to selectively change between a first power transmission path and a second power transmission path. The first power transmission path is configured to transmit the torque to the output shaft via the transmission mechanism. The second power transmission path is configured to transmit the torque to the output shaft via the continuously variable transmission mechanism. The electronic control unit is configured to: (a) selectively change the power transmission path during traveling to one of the first power transmission path and the second power transmission path by controlling the clutch mechanism; and (b) in changing the power transmission path by controlling the clutch mechanism, control an operating point of the internal combustion engine during a change of the power transmission path so that the operating point crosses over an optimum fuel consumption line of the internal combustion engine.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Suitably, a rate of change in a rotation speed of an internal combustion engine corresponds to a variation per unit time in the rotation speed of the internal combustion engine during a change of a power transmission path. The rate of change in the rotation speed of the internal combustion engine is allowed to be changed by controlling a torque capacity of a clutch mechanism that changes the power transmission path.

Suitably, an optimum fuel consumption line of the internal combustion engine corresponds to a preset operating region having an excellent fuel consumption rate, and, in a continuously variable transmission mechanism, a speed ratio is controlled so that an operating point of the engine traces the optimum fuel consumption line.

Hereinafter, an embodiment of the invention will be described in detail with reference to the accompanying drawings. In the following embodiment, the drawings are simplified or modified where appropriate, and the scale ratio, shape, and the like, of each portion are not always accurately drawn.

Figure 1:
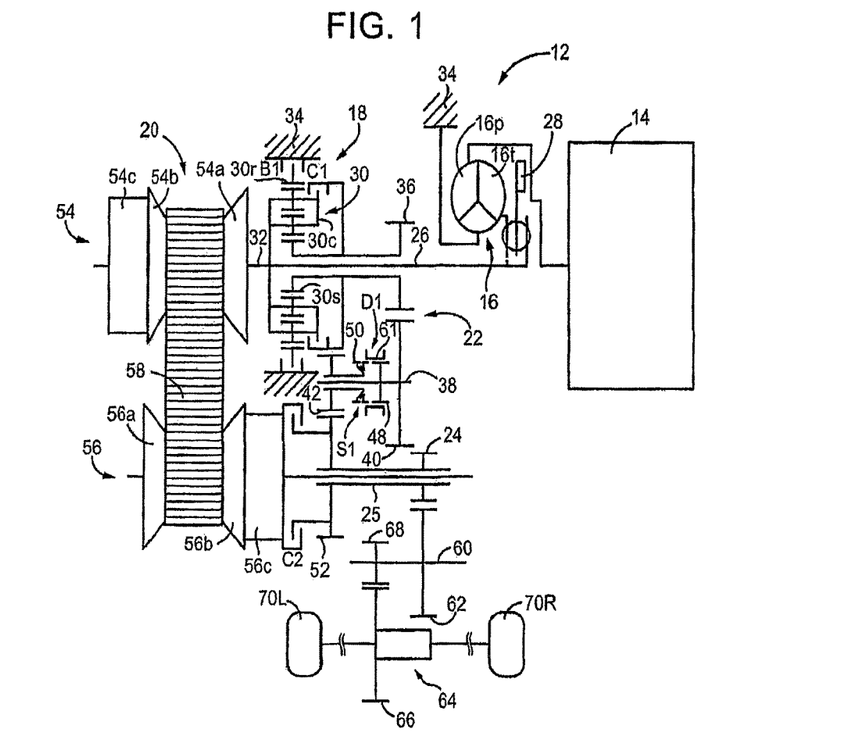
FIG. 1 is a skeletal view for illustrating the schematic configuration of a vehicle driving system according to an embodiment of the invention.

FIG. 1 is a skeletal view for illustrating the schematic configuration of a vehicle driving system 12 (hereinafter, driving system 12) according to the embodiment of the invention. The driving system 12 includes, for example, an engine 14, a torque converter 16, a forward/reverse switching device 18, a belt-type continuously variable transmission mechanism 20 (hereinafter, continuously variable transmission mechanism 20), a gear mechanism 22, an output shaft 25, and a differential gear 64. The engine 14 is used as a driving force source for propelling a vehicle. The torque converter 16 serves as a fluid transmission device. An output gear 24 is formed in the output shaft 25. The output gear 24 is able to transmit power to drive wheels 70. The driving system 12 includes a first power transmission path and a second power transmission path in parallel with each other. Through the first power transmission path, torque (driving force) that is output from the engine 14 is input to a turbine shaft 26 via the torque converter 16, and the torque is transmitted from the turbine shaft 26 to the output shaft 25 via the gear mechanism 22. Through the second power transmission path, the torque input to the turbine shaft 26 is transmitted to the output shaft 25 via the continuously variable transmission mechanism 20. The driving system 12 is configured to change the power transmission path to one of the first power transmission path and the second power transmission path on the basis of a traveling state of the vehicle.

The engine 14 is, for example, formed of an internal combustion engine, such as a gasoline engine or a diesel engine. The torque converter 16 includes a pump impeller 16p and a turbine impeller 16t, and is configured to transmit power via fluid. The pump impeller 16p is coupled to a crankshaft of the engine 14. The turbine impeller 16t is coupled to the forward/reverse switching device 18 via the turbine shaft 26 that corresponds to an output-side member of the torque converter 16. A lockup clutch 28 is provided between the pump impeller 16p and the turbine impeller 16t. When the lockup clutch 28 is completely engaged, the pump impeller 16p and the turbine impeller 16t are integrally rotated.

The forward/reverse switching device 18 is mainly formed of a forward clutch C1, a reverse brake B1, and a double-pinion-type planetary gear train 30. A carrier 30c is integrally coupled to the turbine shaft 26 of the torque converter 16 and the input shaft 32 of the continuously variable transmission mechanism 20. A ring gear 30r is selectively coupled to a housing 34 via the reverse brake B1. The housing 34 serves as a non-rotating member. A sun gear 30s is connected to a small-diameter gear 36. The sun gear 30s and the carrier 30c are selectively coupled to each other via the forward clutch C1. Each of the forward clutch C1 and the reverse brake B1 corresponds to a separating device, and is a hydraulic friction engagement device that is frictionally engaged by a hydraulic actuator.

The sun gear 30s of the planetary gear train 30 is coupled to the small-diameter gear 36 that constitutes the gear mechanism 22. The gear mechanism 22 includes the small-diameter gear 36 and a large-diameter gear 40. The large-diameter gear 40 is provided on a first counter shaft 38 so as to be relatively non-rotatable. An idler gear 42 is provided around the same rotation axis as that of the first counter shaft 38 so as to be relatively rotatable with respect to the first counter shaft 38. A dog clutch D1 is provided between the first counter shaft 38 and the idler gear 42. The dog clutch D1 selectively connects the first counter shaft 38 to the idler gear 42 or disconnects the first counter shaft 38 from the idler gear 42. The dog clutch D1 includes a first gear 48, a second gear 50 and a hub sleeve 61. The first gear 48 is formed on the first counter shaft 38. The second gear 50 is formed on the idler gear 42. Spline teeth are formed on the hub sleeve 61. The spline teeth are able to be fitted to (be engaged with, be meshed with) these first gear 48 and second gear 50. When the hub sleeve 61 is fitted to these first gear 48 and second gear 50, the first counter shaft 38 is connected to the idler gear 42. The dog clutch D1 further includes a synchromesh mechanism S1. The synchromesh mechanism S1 serves as a synchronization mechanism that synchronizes rotation at the time of fitting the first gear 48 to the second gear 50. The gear mechanism 22 corresponds to a transmission mechanism having at least one gear ratio according to the invention.

The idler gear 42 is in mesh with an input gear 52 having a larger diameter than the idler gear 42. The input gear 52 is provided so as to be relatively non-rotatable with respect to the output shaft 25. The output shaft 25 is arranged along a rotation axis common to the rotation axis of a secondary pulley (described later) of the continuously variable transmission mechanism 20. The output shaft 25 is arranged so as to be rotatable around the rotation axis. The input gear 52 and the output gear 24 are provided on the output shaft 25 so as to be relatively non-rotatable. Thus, the forward clutch C1, the reverse brake B1 and the dog clutch D1 are inserted in the first power transmission path through which torque of the engine 14 is transmitted from the turbine shaft 26 via the gear mechanism 22 to the output shaft 25. The turbine shaft 26 corresponds to an input shaft to which torque output from an internal combustion engine is transmitted according to the invention.

The continuously variable transmission mechanism 20 includes a primary pulley 54 (variable pulley 54), the secondary pulley 56 (variable pulley 56), and a transmission belt 58. The continuously variable transmission mechanism 20 is provided in a power transmission path between the input shaft 32 and the output shaft 25. The input shaft 32 is coupled to the turbine shaft 26. The primary pulley 54 is an input-side member provided on the input shaft 32, and has a variable effective diameter. The secondary pulley 56 is an output-side member, and has a variable effective diameter. The transmission belt 58 is wound around the pair of variable pulleys 54, 56 so as to span between the pair of variable pulleys 54, 56. Power is transmitted via friction force between the pair of variable pulleys 54, 56 and the transmission belt 58.

The primary pulley 54 includes a fixed sheave 54a, a movable sheave 54b, and a primary hydraulic actuator 54c. The fixed sheave 54a serves as an input-side fixed rotor fixed to the input shaft 32. The movable sheave 54b serves as an input-side movable rotor provided so as to be relatively non-rotatable around its axis and movable in the axial direction with respect to the input shaft 32. The primary hydraulic actuator 54c generates thrust for moving the movable sheave 54b in order to change the V-groove width between the fixed sheave 54a and the movable sheave 54b. The secondary pulley 56 includes a fixed sheave 56a, a movable sheave 56b, and a secondary hydraulic actuator 56c. The fixed sheave 56a serves as an output-side fixed rotor. The movable sheave 56b serves as an output-side movable rotor provided so as to be relatively non-rotatable around its axis and movable in the axial direction with respect to the fixed sheave 56a. The secondary hydraulic actuator 56c generates thrust for moving the movable sheave 56b in order to change the V-groove width between the fixed sheave 56a and the movable sheave 56b.

The V-groove width of each of the pair of variable pulleys 54, 56 changes, so the winding diameter (effective diameter) of the transmission belt 58 is changed. Thus, an actual speed ratio (gear ratio) γ (=Input shaft rotation speed Nin/Output shaft rotation speed Nout) is continuously changed. For example, when the V-groove width of the primary pulley 54 is reduced, the speed ratio γ decreases. That is, the continuously variable transmission mechanism 20 is upshifted. When the V-groove width of the primary pulley 54 is increased, the speed ratio γ increases. That is, the continuously variable transmission mechanism 20 is downshifted.

A belt driving clutch C2 is inserted between the continuously variable transmission mechanism 20 and the output shaft 25. The belt driving clutch C2 selectively connects the continuously variable transmission mechanism 20 to the output shaft 25 or disconnects the continuously variable transmission mechanism 20 from the output shaft 25. When the belt driving clutch C2 is engaged, the second power transmission path is established. In the second power transmission path, torque of the engine 14 is transmitted to the output shaft 25 via the input shaft 32 and the continuously variable transmission mechanism 20. When the belt driving clutch C2 is released, the second power transmission path is interrupted, and no torque is transmitted from the continuously variable transmission mechanism 20 to the output shaft 25.

The output gear 24 is in mesh with a large-diameter gear 62 fixed to a second counter shaft 60. The large-diameter gear 62 and a small-diameter gear 68 are provided on the second counter shaft 60. The small-diameter gear 68 is in mesh with a differential ring gear 66 of the differential gear 64. The differential gear 64 is formed of a differential mechanism. The differential gear 64 transmits power, input from the differential ring gear 66, to right and left drive wheels 70R, 70L while providing an appropriate rotation speed difference to the right and left drive wheels 70R, 70L. The differential gear 64 is a known technique, so the detailed description thereof is omitted.

Figure 2:
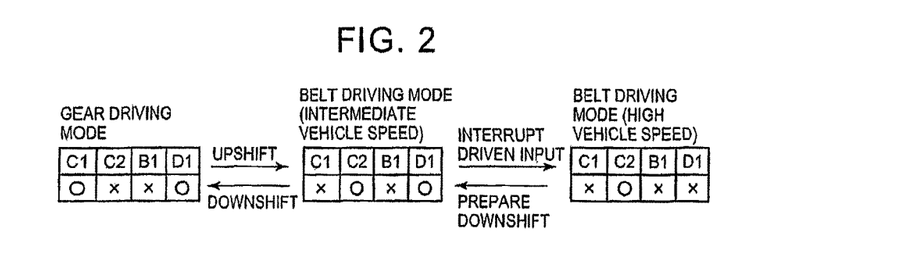
FIG. 2 is a view that shows changes in driving pattern of the driving system shown in FIG. 1.

Next, the operation of the thus-configured driving system 12 will be described by using an engagement chart of engagement elements for each driving pattern shown in FIG. 2. In FIG. 2, C1 corresponds to the operation state of the forward clutch C1, C2 corresponds to the operation state of the belt driving clutch C2, B1 corresponds to the operation state of the reverse brake B1, D1 corresponds to the operation state of the dog clutch D1, "O" indicates an engaged (connected) state, and "x" indicates a released (disconnected) state. The dog clutch D1 includes the synchromesh mechanism S1. When the dog clutch D1 is engaged, the synchromesh mechanism S1 substantially operates. The forward clutch C1 and the belt driving clutch C2 correspond to a clutch mechanism that selectively changes a power transmission path to one of a first power transmission path and a second power transmission path according to the invention.

Initially, the driving pattern in which torque of the engine 14 is transmitted to the output shaft 25 via the gear mechanism 22, that is, the driving pattern in which torque is transmitted through the first power transmission path, will be described. This driving pattern corresponds to the gear driving mode shown in FIG. 2. As shown in FIG. 2, the forward clutch C1 and the dog clutch D1 are engaged (connected), while the belt driving clutch C2 and the reverse brake B1 are released (disconnected).

When the forward clutch C1 is engaged, the planetary gear train 30 that constitutes the forward/reverse switching device 18 is integrally rotated, so the small-diameter gear 36 is rotated at the same rotation speed as the turbine shaft 26. When the dog clutch D1 is engaged, the first counter shaft 38 and the idler gear 42 are connected to each other, and are integrally rotated. Thus, when the forward clutch C1 and the dog clutch D1 are engaged, the first power transmission path is in a connected state, so power of the engine 14 is transmitted to the output shaft 25 and the output gear 24 via the torque converter 16, the turbine shaft 26, the forward/reverse switching device 18, the gear mechanism 22, the idler gear 42 and the input gear 52. The torque transmitted to the output gear 24 is transmitted to the right and left drive wheels 70R, 70L via the large-diameter gear 62, the small-diameter gear 68 and the differential gear 64.

Subsequently, the driving pattern in which torque of the engine 14 is transmitted to the output shaft 25 via the continuously variable transmission mechanism 20 will be described. This driving pattern corresponds to a belt driving mode (high vehicle speed) shown in FIG. 2. As shown in the belt driving mode of FIG. 2, the belt driving clutch C2 is connected, while the forward clutch C1, the reverse brake B1 and the dog clutch D1 are disconnected. When the belt driving clutch C2 is connected, the secondary pulley 56 is connected to the output shaft 25, so the secondary pulley 56 integrally rotates with the output shaft 25 and the output gear 24. Thus, when the belt driving clutch C2 is connected, the second power transmission path is established, and torque of the engine 14 is transmitted to the output shaft 25 and the output gear 24 via the torque converter 16, the turbine shaft 26, the input shaft 32 and the continuously variable transmission mechanism 20. The torque transmitted to the output gear 24 is transmitted to the right and left drive wheels 70R, 70L via the large-diameter gear 62, the small-diameter gear 68 and the differential gear 64. The reason why the dog clutch D1 is released (disconnected) during the belt driving mode in which torque of the engine 14 is transmitted via the second power transmission path is because a drag of the gear mechanism 22, or the like, is eliminated during the belt driving mode, and high rotation of the gear mechanism 22, and the like, is prevented at a high vehicle speed.

The gear driving mode is selected in a low vehicle speed region. A gear ratio EL (Rotation speed Nin of the turbine shaft 26/Rotation speed Nout of the output shaft 25) based on the first power transmission path is set to a value higher than a maximum speed ratio γmax of the continuously variable transmission mechanism 20. That is, the gear ratio EL is set to a value that is not set in the continuously variable transmission mechanism 20. When it is determined to change to the belt driving mode as a result of, for example, an increase in the vehicle speed V, the driving pattern is changed to the belt driving mode. In changing from the gear driving mode to the belt driving mode (high vehicle speed) or changing from the belt driving mode (high vehicle speed) to the gear driving mode, a belt driving mode (intermediate vehicle speed) shown in FIG. 2 is transitionally set.

For example, when the driving pattern is changed from the gear driving mode to the belt driving mode (high vehicle speed), the operation state is transitionally changed from the state where the forward clutch C1 and the dog clutch D1, corresponding to the gear driving mode, are engaged to the state where the belt driving clutch C2 and the dog clutch D1 are engaged. A change of engaged/released state (step shift) is started between the forward clutch C1 and the belt driving clutch C2. At this time, the power transmission path is changed from the first power transmission path to the second power transmission path, and the driving system 12 is substantially upshifted. After the power transmission path is changed, the dog clutch D1 is released (disconnected) in order to prevent an unnecessary drag or high rotation of the gear mechanism 22, or the like (driven input is interrupted).

When the driving pattern is changed from the belt driving mode (high vehicle speed) to the gear driving mode, the operation state is transitionally changed from the state where the belt driving clutch C2 is engaged to the state where the dog clutch D1 is engaged in preparation for changing into the gear driving mode (downshift preparation). At this time, the rotation is also transmitted to the sun gear 30s of the planetary gear train 30 via the gear mechanism 22. When a changed of engaged/released state is carried out between the forward clutch C1 and the belt driving clutch C2 (the forward clutch C1 is engaged and the belt driving clutch C2 is released) from this state, the power transmission path is changed from the second power transmission path to the first power transmission path. At this time, the driving system 12 is substantially downshifted.

As described above, in changing from the gear driving mode (first power transmission path) to the belt driving mode (second power transmission path), a change of the engaged/released state (step shift, shift) is carried out, that is, the forward clutch C1 is released and the belt driving clutch C2 is engaged. As one method of the change of the engaged/released state, it is conceivable to control the operating point of the engine 14 so that the operating point traces the optimum fuel consumption line in a transitional period of the change of the engaged/released state. That is, the change of the engaged/released state is started when the operating point of the engine 14 reaches the intersection with the optimum fuel consumption line in the gear driving mode, and carries out the change of the engaged/released state (hereinafter, shift) while the engine 14 is kept at that operating point. However, there is an inconvenience that a shift time that is required to shift extends and a decrease in the durability of each of the friction materials of the forward clutch C1 and belt driving clutch C2 that are caused to slip for a long time. In the present embodiment, by setting the shift start position as described below, a decrease in the durability of the friction materials of the forward clutch C1 and belt driving clutch C2 is prevented during shifting, and fuel economy is improved.

Figure 3:
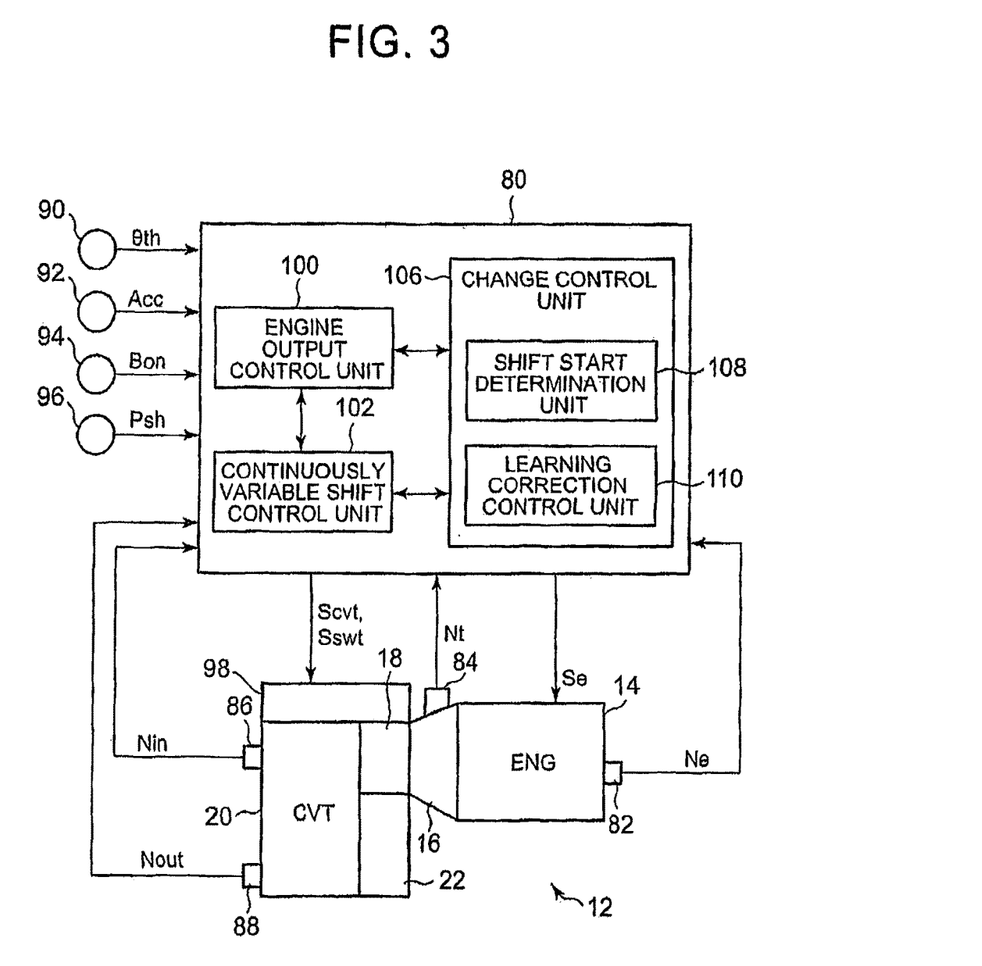
FIG. 3 is a functional block diagram that illustrates input/output lines, of an electronic control unit that controls the driving system shown in FIG. 1 and that illustrates a relevant portion of control functions implemented by the electronic control unit.

FIG. 3 is a functional block diagram that illustrates input/output lines of the electronic control unit 80 provided in the driving system 12 in order to control the engine 14, the continuously variable transmission mechanism 20, and the like, and that illustrates a relevant portion of control functions implemented by the electronic control unit 80. The electronic control unit 80 includes a so-called microcomputer. The microcomputer includes, for example, a CPU, a RAM, a ROM, input/output interfaces, and the like. The CPU executes various controls over the driving system 12 by executing signal processing in accordance with programs prestored in the ROM while utilizing a temporary storage function of the RAM. For example, the electronic control unit 80 is configured to execute output control over the engine 14, shift control and belt clamping force control over the continuously variable transmission mechanism 20, control for appropriately changing the power transmission path of the driving system 12 to one of the gear driving mode and the belt driving mode, and the like. Where necessary, the electronic control unit 80 is split into an electronic control unit for controlling the engine, an electronic control unit for controlling the continuously variable transmission mechanism, an electronic control unit for changing the driving mode, or the like.

A signal indicating a rotation angle (position) Acr of the crankshaft and a rotation speed (engine rotation speed) Ne of the engine 14, a signal indicating a rotation speed (turbine rotation speed) Nt of the turbine shaft 26, a signal indicating the input shaft rotation speed Nin, a signal indicating the output shaft rotation speed Nout, a signal indicating a throttle opening degree θth of an electronic throttle valve, a signal indicating an accelerator operation amount Acc, a signal indicating a brake signal Bon, a signal indicating a lever position (operating position) Psh of a shift lever, and the like, are supplied to the electronic control unit 80. The rotation angle (position) Acr of the crankshaft and the engine rotation speed Ne are detected by an engine rotation speed sensor 82. The turbine rotation speed Nt is detected by a turbine rotation speed sensor 84. The input shaft rotation speed Nin is the rotation speed of the input shaft 32 (primary pulley 54) of the continuously variable transmission mechanism 20, and is detected by an input shaft rotation speed sensor 86. The output shaft rotation speed Nout is the rotation speed of the secondary pulley 56 of the continuously variable transmission mechanism 20, corresponds to the vehicle speed V, and is detected by an output shaft rotation speed sensor 88. The throttle opening degree θth of the electronic throttle valve is detected by a throttle sensor 90. The accelerator operation amount Acc is the operation amount of an accelerator pedal as a driver's acceleration request amount, and is detected by an accelerator operation amount sensor 92. The brake signal Bon indicates a state where a foot brake is operated, and is detected by a foot brake switch 94. The foot brake is a service brake. The lever position (operating position) Psh of the shift lever is detected by a lever position sensor 96. The electronic control unit 80, for example, sequentially calculates the actual speed ratio γ (=Nin/Nout) of the continuously variable transmission mechanism 20 on the basis of the output shaft rotation speed Nout and the input shaft rotation speed Nin.

An engine output control command signal Se, a hydraulic control command signal Scvt, a hydraulic control command signal Sswt, and the like, are output from the electronic control unit 80. The engine output control command signal Se is used for output control over the engine 14. The hydraulic control command signal Scvt is used for hydraulic control associated with a shift of the continuously variable transmission mechanism 20. The hydraulic control command signal Sswt is used to control the forward/reverse switching device 18 (the forward clutch C1, the reverse brake B1), the belt driving clutch C2 and the dog clutch D1 associated with a change of the power transmission path of the driving system 12. Specifically, a throttle signal, an injection signal, an ignition timing signal, and the like, are output as the engine output control command signal Se. The throttle signal is used to control the open/close of the electronic throttle valve by driving a throttle actuator. The injection signal is used to control the amount of fuel that is injected from a fuel injection device. The ignition timing signal is used to control the ignition timing of the engine 14 by an ignition device. A command signal for driving a linear solenoid valve (not shown) that regulates a primary pressure Pin, a command signal for driving a linear solenoid valve (not shown) that regulates a secondary pressure Pout, and the like, are output to a hydraulic control circuit 98 as the hydraulic control command signal Scvt. The primary pressure Pin is supplied to the primary hydraulic actuator 54c. The secondary pressure Pout is supplied to the secondary hydraulic actuator 56c. Command signals, and the like, for respectively driving linear solenoid valves that control hydraulic pressures that are supplied to the forward clutch C1, the reverse brake B1, the belt driving clutch C2 and the synchromesh mechanism S1 are output to the hydraulic control circuit 98 as the hydraulic control command signal Sswt.

Next, the control functions of the electronic control unit 80 will be described. An engine output control unit 100 (engine output control means) shown in FIG. 3, for example, outputs the engine output control command signal Se, such as the throttle signal, the injection signal and the ignition timing signal, to the throttle actuator, the fuel injection device and the ignition device in order to execute output control over the engine 14. The engine output control unit 100, for example, sets a target engine torque Te* for obtaining a required driving force (driving torque). The required driving force is calculated on the basis of the accelerator operation amount Acc and the vehicle speed V. The engine output control unit 100 controls not only the open/close of the electronic throttle valve by the throttle actuator but also the fuel injection amount by the fuel injection device and the ignition timing by the ignition device so that the target engine torque Te* is obtained.

A continuously variable shift control unit 102 (continuously variable shift control means) controls the speed ratio γ of the continuously variable transmission mechanism 20 so that a target speed ratio γ* is obtained. The target speed ratio γ* is calculated on the basis of the accelerator operation amount Acc, the vehicle speed V, the brake signal Bon, and the like. Specifically, the continuously variable shift control unit 102 determines a primary command pressure Pintgt and a secondary command pressure Pouttgt so that the target speed ratio γ* of the continuously variable transmission mechanism 20 is achieved, that is, a target engine rotation speed Ne* is achieved, while a belt slip of the continuously variable transmission mechanism 20 does not occur. The continuously variable shift control unit 102 outputs the primary command pressure Pintgt and the secondary command pressure Pouttgt to the hydraulic control circuit 98. The target speed ratio γ* is set so that the operating point of the engine 14 is on the optimum fuel consumption line. The target engine rotation speed Ne* is set so that the operating point of the engine 14 is on the optimum fuel consumption line. The primary command pressure Pintgt is a command value of the primary pressure Pin (target primary pressure Pin*). The secondary command pressure Pouttgt is a command value of the secondary pressure Pout (target secondary pressure Pout*).

A change control unit 106 (change control means) executes change control for changing the driving pattern on the basis of the traveling state of the vehicle into the gear driving mode using the first power transmission path or the belt driving mode (high vehicle speed) using the second power transmission path. In the gear driving mode, torque of the engine 14 is transmitted to the output gear 24 via the gear mechanism 22. In the belt driving mode (high vehicle speed), torque of the engine 14 is transmitted to the output gear 24 via the continuously variable transmission mechanism 20. The change control unit 106 functionally includes a shift start determination unit 108 (shift start determination means) and a learning correction control unit 110 (learning correction control means).

For example, when it is determined to change to the belt driving mode during traveling in the gear driving mode, the change control unit 106 initially carries out a step shift (upshift) for releasing the forward clutch C1 and engaging the belt driving clutch C2, and releases the dog clutch D1 when the shift completes, as shown in FIG. 2. When it is determined to change to the gear driving mode during traveling in the belt driving mode, the change control unit 106 initially engages the dog clutch D1, and carries out a step shift (downshift) for releasing the belt driving clutch C2 and engaging the forward clutch C1 when engagement of the dog clutch D1 completes, as shown in FIG. 2.

The shift start determination unit 108 determines the start timing at which a step shift is started for changing the engaged/released state between the forward clutch C1 and the belt driving clutch C2. The shift start determination unit 108 stores a shift start point based on the operating point of the engine 14 and determined by the method described below, and determines whether to start shifting on the basis of whether the operating point of the engine 14 has reached the set shift start point.

Figure 4A:
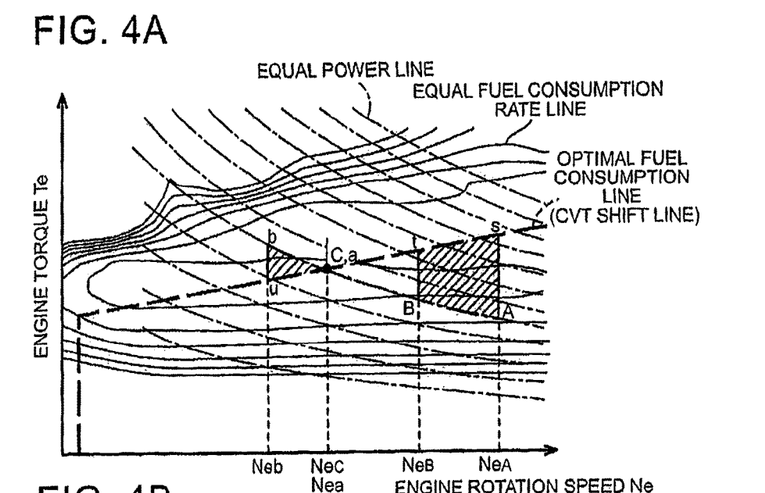
FIG. 4A and FIG. 4B are graphs that illustrate a method of setting a shift start point in upshifting to change from a gear driving mode to a belt driving mode during vehicle acceleration in the driving system shown in FIG. 1.
Figure 4B:
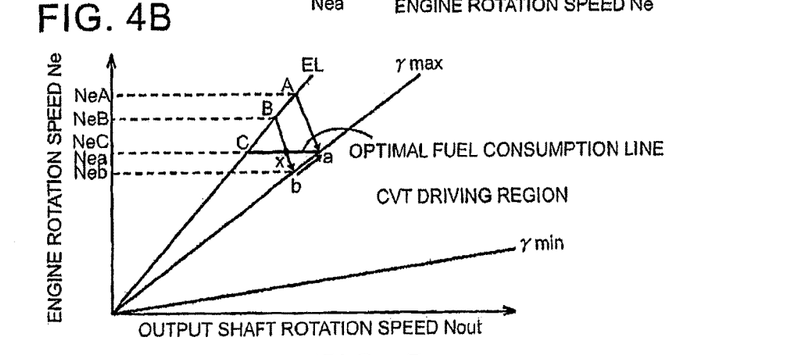

FIG. 4A and FIG. 4B are graphs for illustrating a method of setting the shift start point in, for example, a step shift in which the driving mode is changed from the gear driving mode to the belt driving mode during acceleration of the vehicle (the forward clutch C1 is released and the belt driving clutch C2 is engaged). FIG. 4A corresponds to the characteristic chart of the engine 14. FIG. 4B shows the correlation between the output shaft rotation speed Nout and the engine rotation speed Ne during shifting. In FIG. 4A, the abscissa axis represents engine rotation speed Ne, and the ordinate axis represents engine torque Te. A plurality of narrow alternate long and short dashed lines indicate equal power lines, a plurality of narrow continuous lines indicate equal fuel consumption rate lines, and a wide dashed line indicates the optimum fuel consumption line of the engine 14. In the belt driving mode, the speed ratio γ of the continuously variable transmission mechanism 20 is changed so that the operating point of the engine 14 traces the optimum fuel consumption line. In FIG. 4B, the abscissa axis represents output shaft rotation speed Nout, and the ordinate axis represents engine rotation speed Ne. γmin corresponds to the minimum speed ratio of the continuously variable transmission mechanism 20. γmax corresponds to the maximum speed ratio of the continuously variable transmission mechanism 20. EL corresponds to a gear ratio in the gear driving mode (ExtraLow). The operating points A, B, C, a, b in FIG. 4A respectively correspond to those in FIG. 4B. The engine rotation speeds Ne corresponding to those operating points are NeA, NeB, NeC, Nea, Neb. As is apparent from FIG. 4B, the gear ratio EL in the gear driving mode is set to a value larger than the maximum speed ratio γmax of the continuously variable transmission mechanism 20. Thus, a change from the gear driving mode to the belt driving mode (the forward clutch C1 is released and the belt driving clutch C2 is engaged) is an upshift (step shift).

In FIG. 4B, in changing from the gear driving mode to the belt driving mode (hereinafter, upshifting), the operating point a corresponds to the operating point of the engine 14, which is a target after the upshift, and the operating point of the engine 14 is set to be placed on the optimum fuel consumption line after the upshift. The operating point C corresponds to an operating point at which the engine 14 provides an optimal fuel consumption in the gear driving mode (operating point that intersects with the optimum fuel consumption line). In the gear driving mode, the operating point of the engine 14 traces the gear ratio EL.

In FIG. 4B, a straight line that connects the operating point C to the operating point a corresponds to the optimum fuel consumption line of the engine 14. That is, in upshifting, when the operating point of the engine 14 traces the optimum fuel consumption line, connecting the operating point C to the operating point a, from the operating point C to the operating point a, the fuel consumption is optimum. However, the width of change in the output shaft rotation speed Nout also increases, and the clutches (the forward clutch C1 and the belt driving clutch C2) are slipped for a long time during the upshift, so the durability of the friction materials that constitute each clutch tends to decrease. Thus, the upshift for keeping the operating point of the engine 14 in the optimum fuel consumption line is not optimum in terms of the durability of each clutch. This upshift corresponds to the operating point C and operating point a of the engine 14 in FIG. 4A, and the operating points of the engine 14 are kept at the same operating point C (operating point n) in the optimum fuel consumption line.

After the upshift, when an upshift is carried out so that the operating point of the engine 14 traces the optimum fuel consumption line, it is possible to control the operating point of the engine 14 so as to constantly trace the optimum fuel consumption line in the belt driving mode; however, the operating point deviates from the optimum fuel consumption line just before an upshift in the gear driving mode. The operating point during upshifting at this time corresponds to a change from the operating point A to the operating point a in FIG. 4A and FIG. 4B. As shown in FIG. 4A and FIG. 4B, the operating point shifts to the operating point a in the optimum fuel consumption line just after the upshift; however, a deviation from the optimum fuel consumption line is large at the operating point A just before the upshift.

Therefore, in the present embodiment, an upshift is carried out so that the operating point of the engine 14 crosses over the optimum fuel consumption line during the upshift. Specifically, in FIG. 4A and FIG. 4B, for example, a shift from the operating point B to the operating point b corresponds to this upshift. In this upshift, a shift is started from the operating point B of the engine 14, and the operating point changes to the operating point b over the optimum fuel consumption line. The continuously variable transmission mechanism 20 is shifted so that the operating point of the engine 14 becomes the operating point a in the optimum fuel consumption line. That is, the operating point of the engine 14 changes in order of the operating point B, the operating point b and the operating point a.

Fuel consumption in an upshift in the case where the operating point of the engine 14 has changed (operating point B→operating point b→operating point a) as described above and fuel economy in the case where the operating point has changed from the operating point A to the operating point a are considered. It is assumed that fuel economy is the highest in the case where the operating point of the engine 14 is in the optimum fuel consumption line and a fuel consumption amount increases as a deviation from the optimum fuel consumption line increases. In FIG. 4A and FIG. 4B, the operating point A significantly deviates from the optimum fuel consumption line, so the fuel consumption amount is large; whereas the operating points C, a are in (do not deviate from) the optimum fuel consumption line, so the fuel consumption amount is minimum.

A fuel deterioration amount (the amount of fuel consumed unnecessarily) at the time of comparing the fuel consumption amount in the case where the engine operating point has changed from the operating point A to the operating point a during the upshift with the fuel consumption amount in the case where the engine operating point has changed along the optimum fuel consumption line (operating point C→operating point a) corresponds to an area surrounded by the operating point A, the operating point C and the operating point a in FIG. 4B. In FIG. 4A, the fuel deterioration amount corresponds to a triangular area surrounded by the operating point A, the intersection s of the optimum fuel consumption line with a line drawn upward from the operating point A, and the operating point C (operating point a). As the area increases, the fuel deterioration amount increases.

The fuel deterioration amount in the case where the engine operating point has changed from the operating point B via the operating point b to the operating point a during upshifting corresponds to the sum of the areas of two triangles. One of the triangles is surrounded by the operating point B, the operating point C and an intersection x of the optimum fuel consumption line with a line connecting the operating point B to the operating point b. The other one of the triangles is surrounded by the intersection x, the operating point b and the operating point a.

When these areas are compared with each other, the area in the case of changing from the operating point A to the operating point a is larger than the area in the case of changing from the operating point B via the operating point b to the operating point a. Specifically, in FIG. 4B; the area in the case of changing from the operating point A to the operating point a is larger than the area in the case of changing from the operating point B via the operating point b to the operating point a by a difference in area between a quadrangle and a triangle. The quadrangle is surrounded by the operating point A, the operating point B, the intersection x and the operating point a. The triangle is surrounded by the intersection x, the operating point b and the operating point a. In FIG. 4A, the increase in the area corresponds to a difference between the area of a shaded quadrangle and the area of a shaded triangle. The shaded quadrangle is surrounded by the operating point B, the operating point A, the intersection s and an intersection t of the optimum fuel consumption line with a line drawn upward from the operating point B. The shaded triangle is surrounded by the operating point C, the operating point b and an intersection u of the optimum fuel consumption line with a line drawn downward from the operating point b. As is apparent from the area difference shown in FIG. 4A and FIG. 4B, the area in the case of changing from the operating point A to the operating point a is larger than the area in the case of changing from the operating point B via the operating point b to the operating point a, so the fuel consumption amount is smaller in the case of changing from the operating point B via the operating point b to the operating point a. Thus, because the engine operating point crosses over the optimum fuel consumption line during upshifting, a region near the optimum fuel consumption line is used, so fuel economy improves. When the operating point A has changed to the operating point a as described above, fuel economy decreases as compared to the case where the operating point crosses over the optimum fuel consumption line; however, a variation in the output shaft rotation speed Nout is minimized, so abrasion decreases.

Figure 5:
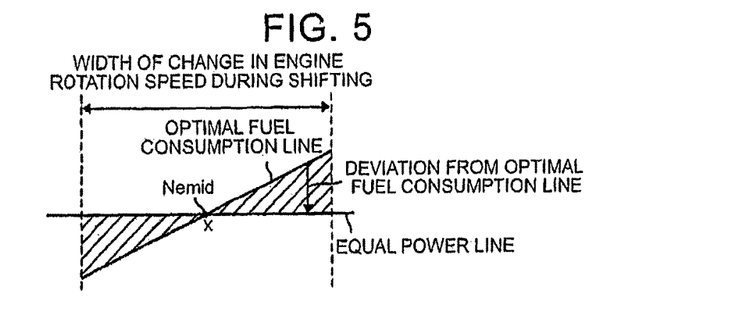
FIG. 5 is a view that conceptually shows the operating point of an engine at which a median value between engine rotation speeds before and after a shift during upshifting becomes an optimum fuel consumption point in FIG. 4A and FIG. 4B.

Incidentally, even when an upshift is carried out so that the engine operating point during upshifting crosses over the optimum fuel consumption line, it is controversial what timing the upshift is started. As described above, when the operating point crosses over the optimum fuel consumption line, two triangles are formed, and it is desirable that the sum of the areas of these triangles be minimum. As shown in FIG. 5, the timing when the sum of the areas of the two triangles is minimum is the timing when the intersection x of the optimum fuel consumption line with the equal power line of the engine 14 is medium between the engine rotation speeds Ne before and after a shift (before and after a change) during upshifting. Therefore, a shift start point that brings the median value between the engine rotation speeds Ne before and after a shift during upshifting into coincidence with an optimum fuel consumption point (that is, causes the operating point to pass through the optimum fuel consumption point) is calculated.

For example, when a predetermined shift start point (for example, the operating point B) is set and, in addition, a target rate of change (rate of shift) in the engine rotation speed Ne is set in advance, the engine rotation speed Neb at the operating point (operating point b) at which the speed ratio after the upshift becomes the maximum speed ratio γmax is allowed to be calculated. Thus, a median value Nemid between the engine rotation speed NeB just before the upshift and the engine rotation speed Neb after the upshift is also allowed to be calculated. By obtaining the shift start point (engine rotation speed NeB) that brings the median value Nemid into coincidence with the optimum fuel consumption point, it is possible to obtain the shift start point (the operating point of the engine 14) that provides optimum fuel economy. The shift start determination unit 108 prestores the thus obtained shift start point (the operating point of the engine 14) as an operating point of the engine 14 for determining an upshift. When the operating point of the engine 14 reaches the operating point corresponding to the shift start point in the gear driving mode, the shift start determination unit 108 determines to start upshifting. When the change control unit 106 starts shifting and executes control so that the shift is carried out at a predetermined rate of shift, the median value Nemid is controlled so as to pass through the optimum fuel consumption line or near the optimum fuel consumption line.

In the above-described method of determining a shift start point, the shift start point is determined on the assumption that fuel economy deteriorates as the operating point of the engine 14 distances from the optimum fuel consumption line. However, even when a deviation from the optimum fuel consumption line is the same, actually, a fuel consumption amount also changes when the operating point of the engine 14 varies. Thus, in the above-described determination method, the fuel consumption amount is not always optimum. As another method of determining a shift start point, a fuel consumption amount during an upshift is calculated on the basis of a fuel consumption amount at each operating point of the engine 14, and determines the shift start point so that the consumption amount is minimum. In other words, a determining method takes into consideration a fuel consumption amount at the engine operating point in addition to the comparison of the above-described areas. Hereinafter, a specific determining method will be described.

Initially, a fuel consumption amount in the case where the engine operating point is kept in the optimum fuel consumption line during upshifting is calculated as a reference fuel consumption Ma. The reference fuel consumption Ma is calculated by the following mathematical expression (1). Here, Nea corresponds to a target rotation speed after the upshift, Fca corresponds to a fuel consumption amount at the target rotation speed (optimum fuel consumption point), and ta corresponds to a shift time t during upshifting. Fca is known from the engine characteristic (fuel consumption rate characteristic) of the engine 14 in advance, ta is also preset as a target shift time. The reference fuel consumption Ma that is obtained from the mathematical expression (1) is the amount of fuel that is minimally required during upshifting.

$$Ma = Nea \times Fca \times ta \tag{1}$$

Next, a fuel consumption Mb resulting from an upshift (step shift) is calculated. The fuel consumption Mb during upshifting is calculated by the following mathematical expression (2). Here, Ne corresponds to an engine rotation speed Ne during upshifting, Fcb corresponds to a fuel consumption amount at each engine rotation speed Ne, and is a value obtained in advance on the basis of the engine characteristic (fuel consumption rate characteristic) of the engine 14.

$$Mb=\Sigma(Ne \times Fcb) \quad (2)$$

A fuel consumption difference ΔM (=Mb−Ma) between the fuel consumption Mb during upshifting and the reference fuel consumption Ma is calculated, and a shift start point (the operating point of the engine 14) that causes the fuel consumption difference ΔM to become minimum is determined. The shift start determination unit 108 prestores the thus obtained shift start point (the operating point of the engine 14) as the operating point of the engine 14 for determining a shift. When the operating point of the engine 14 reaches the operating point corresponding to the shift start point in the gear driving mode, the shift start determination unit 108 determines to start upshifting. The fuel consumption difference ΔM is minimum when the operating point of the engine 14 is kept in the optimum fuel consumption line as described above. However, it is assumed that the operating point of the engine 14 crosses over the optimum fuel consumption line during upshifting, so the operating point of the engine 14 is different from that when the operating point is kept in the optimum fuel consumption line.

In each of the above-described two methods of determining a shift start point, a target shift time t* that is a target of an upshift is set in advance, the rate of shift that satisfies the target shift time t* is set, and a shift start point is set on the basis of the rate of shift. Thus, not only the shift start point of an upshift but also the rate of shift (or target shift time) during upshifting is set in advance. The rate of shift is controlled by the hydraulic pressures of the forward clutch C1 and belt driving clutch C2. When the shift start determination unit 108 determines to start upshifting, the change control unit 106 controls the hydraulic pressures that are supplied to the forward clutch C1 and the belt driving clutch C2 so that the preset rate of shift or the preset target shift time t* is achieved. A shift is started from the shift start timing stored in the shift start determination unit 108, and the rate of shift is controlled so as to be a predetermined rate of shift. As a result, the operating point of the engine 14 during shifting is controlled so as to cross over the optimum fuel consumption line.

The learning correction control unit 110 executes learning control each time an upshift is carried out. That is, the learning correction control unit 110 measures a shift time t from the start of the upshift to the completion of the upshift (a time that is taken while the engine operating point changes from the operating point B via the operating point b to the operating point a) at any time, and changes the shift start point or hydraulic pressure command values of the clutches (the forward clutch C1 and the belt driving clutch C2) so that the shift time t becomes the target shift time t* set in advance. For example, the learning correction control unit 110 executes learning control as follows. The learning correction control unit 110 calculates a difference Δt (|t*−t|) between the target shift time t* and an actual shift time t and, when the difference Δt exceeds a predetermined value α set in advance, changes the operating point at the shift start or the hydraulic pressure command values of the clutches. For example, when the actual shift time t exceeds the target shift time t*, the learning correction control unit 110 increases the hydraulic pressure command value of the engage-side belt driving clutch C2 or changes the shift start determination operating point of the engine 14 for determining an upshift toward a further high rotation speed side, thus changing the operating point of the shift start or the hydraulic pressure command values of the clutches so that the shift time t shortens.

There is a delay time from the timing at which an upshift is determined to when the upshift is actually started and then the engine rotation speed Ne begins to change as the hydraulic pressures are supplied to the forward clutch C1 and the belt driving clutch C2. The learning correction control unit 110 corrects the shift start point as needed in consideration of the delay time. The correction is also changed on the basis of, for example, the oil temperature of hydraulic oil, or the like. As the oil temperature of hydraulic oil decreases, a time until the engine rotation speed No begins to change extends. Thus, as the oil temperature of hydraulic oil decreases, the shift time t is corrected to shorten. The engine rotation speed Ne and the turbine shaft rotation speed Nt change on the basis of a state of engagement of the lockup clutch 28. The learning correction control unit 110 corrects the shift start point as needed on the basis of the state of engagement of the lockup clutch 28. The learning correction control unit 110, for example, prestores a correlation map between the differential pressure ΔP (Pon−Poff) of the lockup clutch 28 and a correction value of the shift start point or a correction value of the hydraulic pressure command value of each clutch, and corrects the shift start point or the hydraulic pressure command value of each clutch on the basis of the correlation map.

In the above description, in an upshift for changing from the gear driving mode to the belt driving mode, the method of determining the shift start point of the upshift is described. As for a downshift for changing from the belt driving mode to the gear driving mode as well, a shift start point of the downshift is determined by a similar method.

Figure 6:
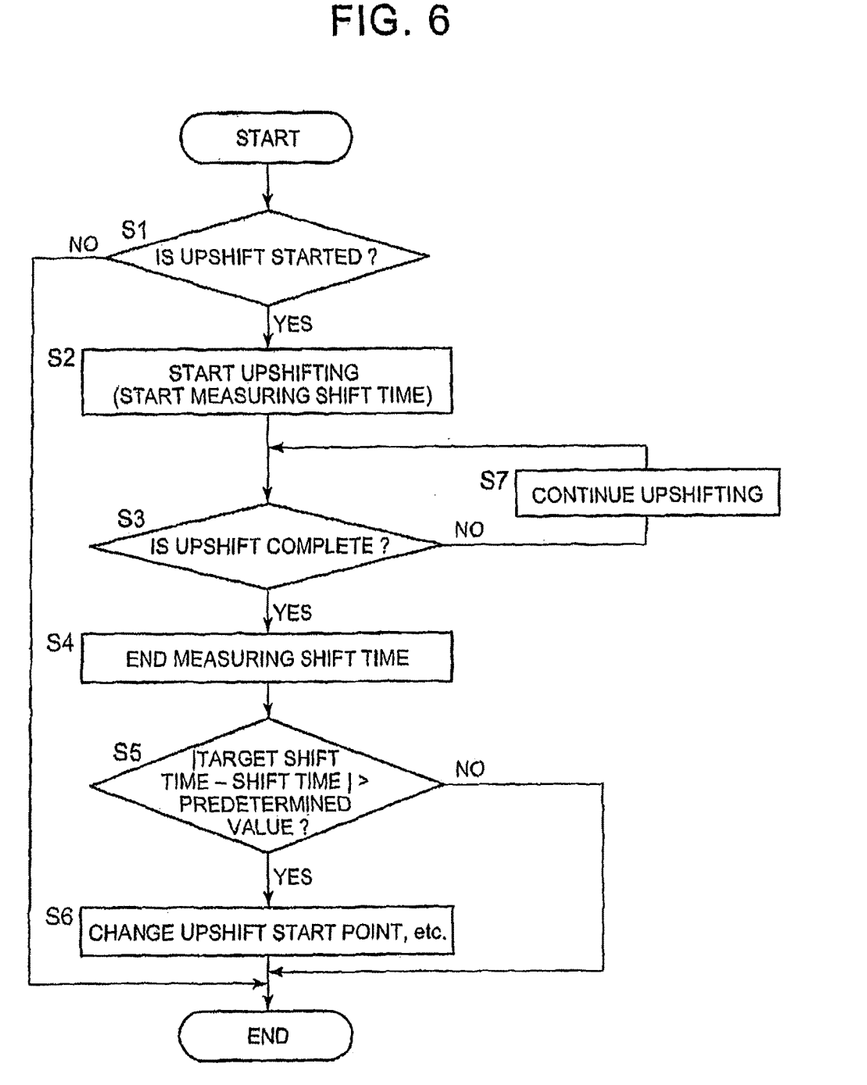
FIG. 6 is a flowchart that illustrates a relevant portion of control operations of an electronic control unit shown in FIG. 3, that is, control operations for suppressing a decrease in the durability of friction materials of clutches while reducing a fuel consumption amount in changing (shifting) between the gear driving mode and the belt driving mode.

FIG. 6 is a flowchart that illustrates a relevant portion of control operations of the electronic control unit 80, that is, control operations for suppressing a decrease in the durability of the clutches while reducing a fuel consumption amount in changing (shifting) between the gear driving mode and the belt driving mode. This flowchart is repeatedly executed at an extremely short cycle time of about, for example, several milliseconds to several tens of milliseconds. FIG. 6 shows a change (upshift) from the gear driving mode to the belt driving mode as an example; however, the invention is also applicable to a change (downshift) from the belt driving mode to the gear driving mode.

In step S1 (hereinafter, step is omitted) corresponding to the shift start determination unit 108, it is determined whether the operating point of the engine 14 has reached the operating point at which an upshift is started and that is obtained and stored in advance. The operating point at which the upshift is started is set to the operating point that crosses over the optimum fuel consumption line during the upshift and consumption of fuel is reduced during the upshift, as described above. When negative determination is made in S1, the routine is ended.

When affirmative determination is made in S1, in S2 corresponding to the change control unit 106 and the learning correction control unit 110, an upshift (change of the engaged/released state, step shift) for releasing the forward clutch C1 and engaging the belt driving clutch C2 is started, and measurement of the shift time t is started at the same time. In S3 corresponding to the change control unit 106, it is determined whether the upshift has completed. When negative determination is made in S3, in S7 corresponding to the change control unit 106, the upshift is continuously carried out, and the process returns to S3.

When affirmative determination is made in S3, in S4 corresponding to the learning correction control unit 110, measurement of the shift time t ends. Subsequently, in S5 corresponding to the learning correction control unit 110, the difference Δt (=|t−t*|) between the previously set target shift time t* and the currently measured shift time t is calculated, and it is determined whether the calculated difference Δt exceeds the predetermined value α set in advance. When negative determination is made in S5, the routine is ended. When affirmative determination is made in S5, in S6 corresponding to the learning correction control unit 110, the operating point of the engine 14 for determining the start of the upshift, stored in the shift start determination unit 108, or the hydraulic pressure command value of each clutch is changed to a new value so that the shift time t approaches the target shift time t*.

As described above, according to the present embodiment, generally, the fuel consumption amount increases as the operating point of the engine 14 distances from the optimum fuel consumption line. Thus, during changing (shifting) of the power transmission path, it is desirable to cause the operating point of the engine 14 to trace the optimum fuel consumption line; however, there is a possibility that the shift time extends and the durability of the friction materials that constitute each of the clutches decreases. Therefore, by setting the operating point of the engine 14 so that the operating point crosses over the optimum fuel consumption line of the engine 14 during changing (shifting) of the power transmission path, it is possible to use a region close to the optimum fuel consumption line in a shift transitional period, so the fuel consumption amount during shifting is reduced, and extension of the shift time t is suppressed, with the result that a decrease in the durability of the clutches is also suppressed. For example, when the changed operating point of the engine 14 is caused to coincide with the optimum fuel consumption line at the timing of the end of changing the power transmission path without crossing over the optimum fuel consumption line, the fuel consumption amount increases because a deviation from the optimum fuel consumption line at the timing of the start of change is large; however, the fuel consumption amount is reduced when the operating point crosses over the optimum fuel consumption line.

According to the present embodiment, the operating point of the engine 14 for determining the start of shift and the rate of change in the engine rotation speed Ne during shifting are set so that the median value Nemid between the engine rotation speeds Ne before and after the shift during shifting (during changing of the power transmission path) passes through the optimum fuel consumption line or near the optimum fuel consumption line. Thus, on the assumption that the fuel economy deteriorates as the operating point of the engine 14 deviates from the optimum fuel consumption line, the fuel consumption amount during shifting is minimized.

According to the present embodiment, in the range in which the operating point of the engine 14 crosses over the optimum fuel consumption line during shifting, the operating point of the engine 14 for determining the start of shift and the rate of change in the engine rotation speed Ne during shifting are set so that the fuel consumption amount of the engine 14, consumed during shifting, is minimized. Thus, in the range in which the operating point crosses over the optimum fuel consumption line during shifting, the fuel consumption amount during shifting is minimized. Specifically, the operating point of the engine 14 for determining the start of shift and the rate of change in the engine rotation speed Ne during shifting are set so that a fuel consumption difference ΔM (Mb−Ma) between the fuel consumption Mb and the reference fuel consumption Ma during shifting (during changing of the power transmission path) is minimum. Thus, in the range in which the operating point crosses over the optimum fuel consumption line during shifting, the fuel consumption amount during shifting is minimized.

According to the present embodiment, learning control for learning the operating point of the engine 14 for determining the start of shift and the rate of change in the engine rotation speed Ne during shifting is executed so that the shift time t that is required for shifting becomes the preset target shift time t*. With this configuration, the operating point of the engine 14 for determining the start of shift and the rate of change in the engine rotation speed Ne during shifting are changed by learning control to appropriate values at any time, so it is possible to constantly keep the shift time t near the target shift time t*.

Next, another embodiment of the invention will be described. In the following description, like reference numerals denote portions common to those of the above-described embodiment, and the description is omitted.

A vehicle driving system 130 (hereinafter, driving system 130) according to the present embodiment differs from the driving system 12 according to the above-described embodiment in that a gear ratio EH (ExtraHi) in the case where the gear driving mode is selected is set to a value smaller than the minimum speed ratio γmin of the continuously variable transmission mechanism 20. That is, the gear ratio EH on a higher speed side than the minimum speed ratio γmin of the continuously variable transmission mechanism 20 is set. Thus, in the driving system 130, an upshift is carried out when the driving mode is changed from the belt driving mode to the gear driving mode, and a downshift is carried out when the driving mode is changed from the gear driving mode to the belt driving mode. The operation (shift) of the forward clutch C1 and belt driving clutch C2 in changing the power transmission path between the gear driving mode and the belt driving mode is similar to that of the above-described embodiment. The other configuration is similar to that of the above-described driving system 12, so the description of the other configuration is omitted.

Figure 7A:
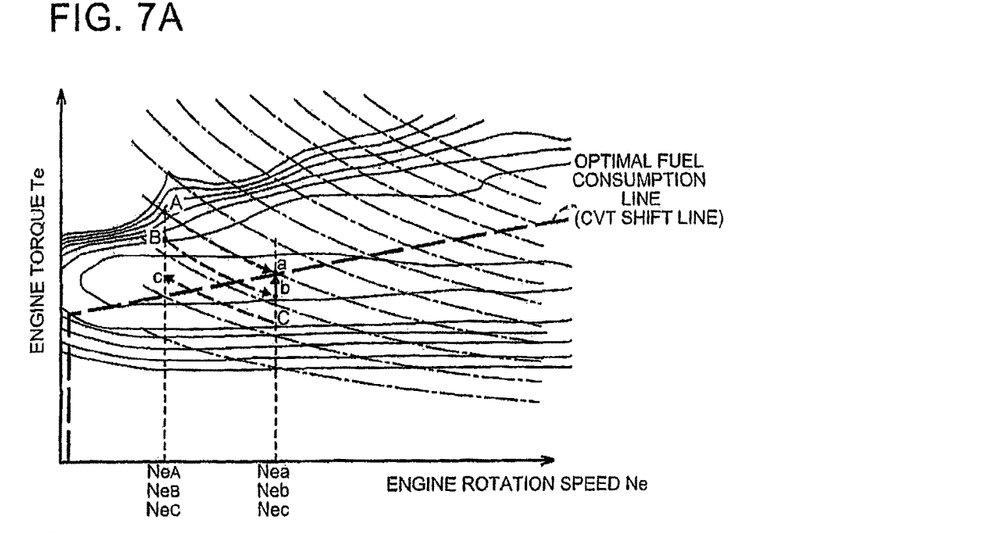
FIG. 7A and FIG. 7B are graphs that illustrate a method of setting a shift start point in the case of changing from the gear driving mode to the belt driving mode at the time of a kick-down shift as a result of depression of an accelerator pedal in a driving system according to another embodiment of the invention.
Figure 7B:
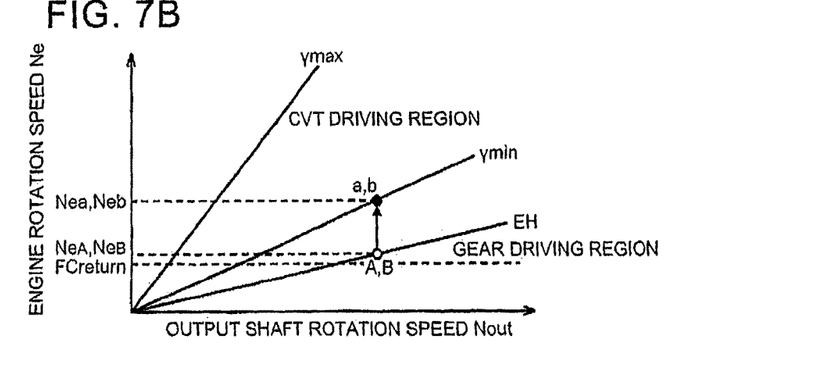

FIG. 7A and FIG. 7B are views for illustrating a method of setting a shift start point at the time when a downshift (kick-down shift) is carried out by, for example, depressing an accelerator pedal in the gear driving mode in the vehicle driving system 130, and respectively correspond to FIG. 4A and FIG. 4B according to the above-described embodiment. As is apparent from FIG. 7B, the gear ratio EH in the gear driving mode has a value smaller than the minimum speed ratio γmin of the belt driving mode. A downshift in the gear driving mode corresponds to a shift into the minimum speed ratio γmin of the continuously variable transmission mechanism 20 that is set to a lower speed side than the gear ratio EH of the gear driving mode, that is, a change from the gear driving mode to the belt driving mode (the forward clutch C1 is released and the belt driving clutch C2 is engaged).

In FIG. 7A and FIG. 7B, when a downshift is started at the operating point A of the engine 14, a fuel consumption just after the downshift is optimum because the operating point a just after the downshift coincides with the minimum speed ratio γmin in the optimum fuel consumption line; however, the operating point deviates from the optimum fuel consumption line just before the downshift in the gear driving mode. On the other hand, as in the case of the above-described embodiment, for example, by changing the operating point from the operating point B to the operating point b across the optimum fuel consumption line before and after the downshift, it is possible to use a region near the optimum fuel consumption line before and after the downshift, so fuel economy also improves. A specific method of determining the shift start point may be determined as in the case of the above-described embodiment. For example, a fuel consumption becomes optimum by setting the operating point so that the operating point passes through the optimum fuel consumption line at the median value between the engine rotation speeds Ne before and after the shift or near the median value. Alternatively, a fuel consumption amount during a downshift is calculated on the basis of a fuel consumption rate characteristic of the engine 14, and a shift start point that causes the fuel consumption amount to become minimum is determined. The detailed description is basically similar to that of the above-described embodiment, so the description is omitted.

The determination of the shift start point is not limited to a change from the gear driving mode to the belt driving mode. The determination of the shift start point is also applicable to a change from the belt driving mode to the gear driving mode. For example, an upshift from the operating point C to the operating point c in FIG. 7A is one example of that. In this case as well, by setting the operating point so that the operating point crosses over the optimum fuel consumption line during changing from the operating point C to the operating point c, a region near the optimum fuel consumption line is used, so fuel economy improves. The reason why the route of the engine operating point is different between a change (downshift) from the gear driving mode to the belt driving mode (from the operating point B to the operating point b) and a change (upshift) from the belt driving mode to the gear driving mode (from the operating point C to the operating point c) is that a shift line hysteresis is set for a downshift and an upshift. By setting the shift line hysteresis, it is possible to avoid a feeling of strangeness due to, for example, a frequent repetition of a downshift and an upshift.

As described above, with the driving system 130 that is configured such that the gear ratio EH in the gear driving mode is set so as to be smaller than the minimum speed ratio γmin of the continuously variable transmission mechanism 20 according to the present embodiment as well, substantially similar advantageous effects to those of the above-described embodiment are obtained.

The embodiments of the invention are described in detail with reference to the drawings; however, the invention is also applicable to another mode.

For example, in the above-described embodiments, the gear ratio EL of the first power transmission path of the driving system 10 is set so as to be larger than the maximum speed ratio γmax of the continuously variable transmission mechanism 20, and the gear ratio EH of the first power transmission path of the driving system 130 is set so as to be smaller than the minimum speed ratio γmin of the continuously variable transmission mechanism 20. However, the first power transmission path may be configured to be selectively changeable to one of the gear ratio EL and the gear ratio EH. In such a case, a change between the gear driving mode and the belt driving mode is carried out between the gear ratio EL and the maximum speed ratio γmax or between the gear ratio EH and the minimum speed ratio γmin, and the operating point of the engine 14 is set so as to cross over the optimum fuel consumption line in any of these changes. Thus, it is possible to achieve both a reduction in the fuel consumption amount and prevention of a decrease in the durability of the clutches.

In the above-described embodiments, the continuously variable transmission mechanism 20 is formed of a belt-type continuously variable transmission; instead, the continuously variable transmission mechanism 20 may be replaced with, for example, a toroidal continuously variable transmission, or the like, as needed.

The electronic control unit 80 according to the above-described embodiments is split into applications, such as an electronic control unit for controlling the engine, an electronic control unit for controlling the continuously variable transmission mechanism and an electronic control unit for changing the driving pattern; however, the electronic control unit 80 does not always need to be split, and may be formed of a single electronic control unit.

The above-described embodiments are only illustrative, and the invention may be implemented in modes including various modifications or improvements on the basis of the knowledge of persons skilled in the art.

The invention claimed is:

1. A control apparatus for a vehicle driving system, the vehicle driving system including a continuously variable transmission mechanism, a transmission mechanism and a clutch mechanism, the continuously variable transmission mechanism and the transmission mechanism being provided in parallel with each other in a power transmission path between an input shaft and an output shaft, torque output from an internal combustion engine being transmitted to the input shaft, the output shaft being coupled to a drive wheel so as to transmit power, the transmission mechanism having at least one gear ratio, the clutch mechanism being configured to selectively change between a first power transmission path and a second power transmission path, the first power transmission path being configured to transmit the torque to the output shaft via the transmission mechanism, the second power transmission path being configured to transmit the torque to the output shaft via the continuously variable transmission mechanism, the control apparatus comprising:
an electronic control unit configured to:
(a) selectively change the power transmission path during traveling to one of the first power transmission path and the second power transmission path by controlling the clutch mechanism; and
(b) in changing the power transmission path by controlling the clutch mechanism, control an operating point of the internal combustion engine during a change of the power transmission path so that the operating point crosses over an optimum fuel consumption line of the internal combustion engine.

2. The control apparatus according to claim 1, wherein the electronic control unit is configured to set an operating point of the internal combustion engine for determining a start of change of the power transmission path and a rate of change in a rotation speed of the internal combustion engine during the change so that a median value between rotation speeds of the internal combustion engine before and after the change of the power transmission path during the change passes either through the optimum fuel consumption line, or near to the optimum fuel consumption line.

3. The control apparatus according to claim 1, wherein the electronic control unit is configured to set an operating point of the internal combustion engine for determining a start of change of the power transmission path and a rate of change in a rotation speed of the internal combustion engine during the change so that a fuel consumption amount of the internal combustion engine is minimized in a range that includes a point at which the operating point of the internal combustion engine crosses over the optimum fuel consumption line during the change, and the fuel consumption amount is consumed during the change.

4. The control apparatus according to claim 3, wherein the electronic control unit is configured to set the operating point of the internal combustion engine for determining the start of change of the power transmission path and the rate of change in the rotation speed of the internal combustion engine during the change so that a difference between a fuel consumption during the change and a reference fuel consumption is minimized, and the reference fuel consumption is set when the operating point of the internal combustion engine during the change is kept in the optimum fuel consumption line.

5. The control apparatus according to claim 1, wherein the transmission mechanism has at least one of a gear ratio larger than a maximum speed ratio of the continuously variable transmission mechanism or a gear ratio smaller than a minimum speed ratio of the continuously variable transmission mechanism.

6. A control method for a vehicle driving system, the vehicle driving system including a continuously variable transmission mechanism, a transmission mechanism, a clutch mechanism, and an electronic control unit, the continuously variable transmission mechanism and the transmission mechanism being provided in parallel with each other in a power transmission path between an input shaft and an output shaft, torque output from an internal combustion engine being transmitted to the input shaft, the output shaft being coupled to a drive wheel so as to transmit power, the transmission mechanism having at least one gear ratio, the clutch mechanism being configured to selectively change between a first power transmission path and a second power transmission path, the first power transmission path being configured to transmit the torque to the output shaft via the transmission mechanism, the second power transmission path being configured to transmit the torque to the output shaft via the continuously variable transmission mechanism, the control method comprising:
  (a) selectively changing, by the electronic control unit, the power transmission path during traveling to one of the first power transmission path and the second power transmission path by controlling the clutch mechanism; and
  (b) in changing the power transmission path by controlling the clutch mechanism, controlling, by the electronic control unit, an operating point of the internal combustion engine during a change of the power transmission path so that the operating point crosses over an optimum fuel consumption line of the internal combustion engine.

7. The control method according to claim 6, further comprising:
  setting, by the electronic control unit, an operating point of the internal combustion engine for determining a start of change of the power transmission path and a rate of change in a rotation speed of the internal combustion engine during changing so that a median value between rotation speeds of the internal combustion engine before and after the change during changing of the power transmission path passes through one of the optimum fuel consumption line and near the optimum fuel consumption line.

8. The control method according to claim 6, further comprising:
  setting, by the electronic control unit, an operating point of the internal combustion engine for determining a start of change of the power transmission path and a rate of change in a rotation speed of the internal combustion engine during changing so that a fuel consumption amount of the internal combustion engine, which is consumed during changing of the power transmission path, is minimized in a range in which the operating point of the internal combustion engine crosses over the optimum fuel consumption line during changing of the power transmission path.

9. The control method according to claim 8, further comprising:
  setting, by the electronic control unit, the operating point of the internal combustion engine for determining the start of change of the power transmission path and the rate of change in the rotation speed of the internal combustion engine during changing so that a difference between a fuel consumption during changing of the power transmission path and a reference fuel consumption is minimized, and the reference fuel consumption being set when the operating point of the internal combustion engine during changing is kept on the optimum fuel consumption line.

10. A vehicle driving system comprising:
  an input shaft to which torque from an internal combustion engine is transmitted;
  an output shaft coupled to a drive wheel so as to transmit power;
  a continuously variable transmission mechanism and a transmission mechanism provided in parallel with each other in a power transmission path between the input shaft and the output shaft, the transmission mechanism having at least one gear ratio;
  a clutch mechanism configured to selectively change between a first power transmission path and a second power transmission path, the first power transmission path being configured to transmit the torque to the output shaft via the transmission mechanism, the second power transmission path being configured to transmit the torque to the output shaft via the continuously variable transmission mechanism; and
  an electronic control unit configured to:
  (a) selectively change the power transmission path during traveling to one of the first power transmission path and the second power transmission path by controlling the clutch mechanism; and
  (b) in changing the power transmission path by controlling the clutch mechanism, control an operating point of the internal combustion engine during a change of the power transmission path so that the operating point crosses over an optimum fuel consumption line of the internal combustion engine.

11. The vehicle driving system according to claim 10, wherein
  the electronic control unit is configured to set an operating point of the internal combustion engine for determining a start of change of the power transmission path and a rate of change in a rotation speed of the internal combustion engine during the change so that a median value between rotation speeds of the internal combustion engine before and after the change of the power transmission path during the change passes through one of the optimum fuel consumption line and near the optimum fuel consumption line.

12. The vehicle driving system according to claim 10, wherein
the electronic control unit is configured to set an operating point of the internal combustion engine for determining a start of change of the power transmission path and a rate of change in a rotation speed of the internal combustion engine during the change so that a fuel consumption amount of the internal combustion engine is minimized in a range in which the operating point of the internal combustion engine crosses over the optimum fuel consumption line during the change, and the fuel consumption amount is consumed during the change.

13. The vehicle driving system according to claim 12, wherein
the electronic control unit is configured to set the operating point of the internal combustion engine for determining the start of change of the power transmission path and the rate of change in the rotation speed of the internal combustion engine during the change so that a difference between a fuel consumption during the change and a reference fuel consumption is minimized, and the reference fuel consumption is set when the operating point of the internal combustion engine during the change is kept in the optimum fuel consumption line.

14. The vehicle driving system according to claim 10, wherein
the transmission mechanism has at least one of a gear ratio larger than a maximum speed ratio of the continuously variable transmission mechanism or a gear ratio smaller than a minimum speed ratio of the continuously variable transmission mechanism.

* * * * *